June 6, 1961     H. H. PORTER     2,987,270
VEHICLE FOR TESTING CONTROL SYSTEMS AT SUBSONIC SPEED
Filed March 22, 1950
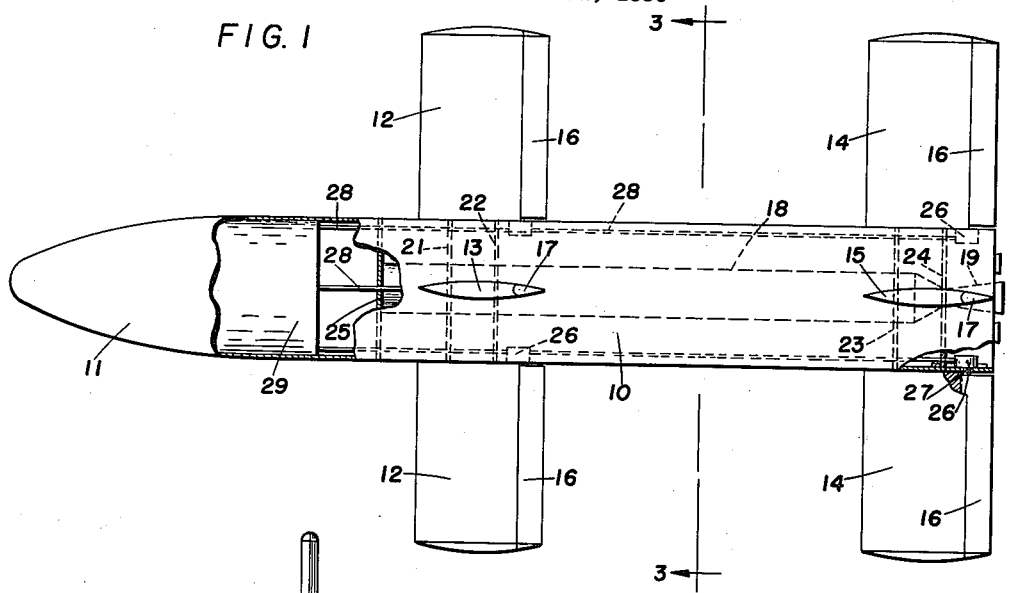
FIG. 1
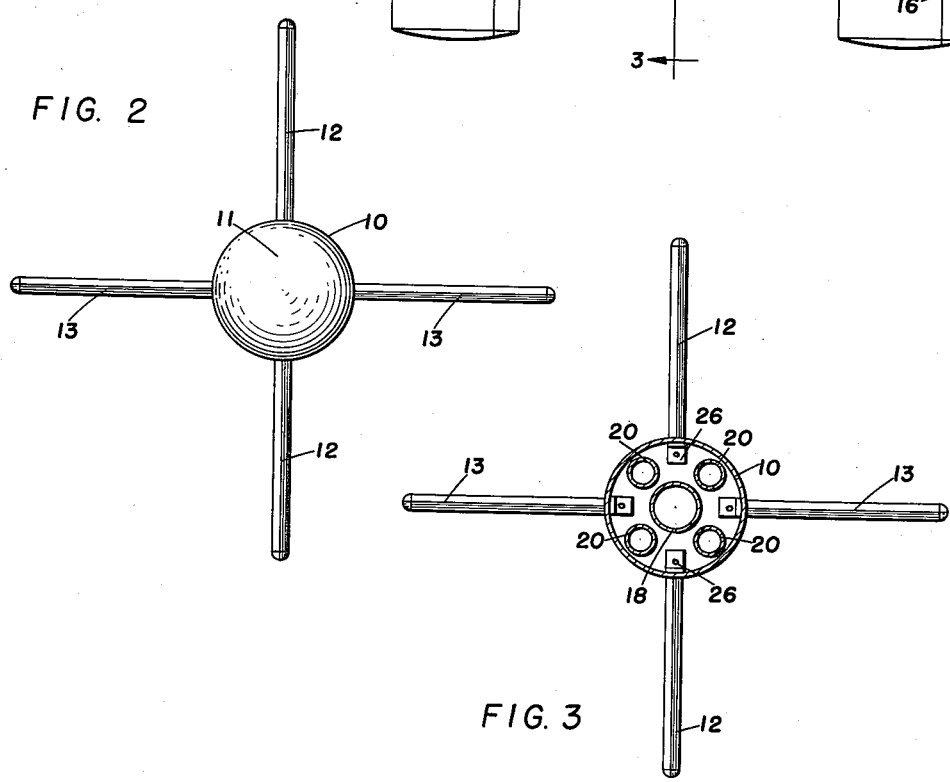
FIG. 2
FIG. 3
INVENTOR.
HENRY H. PORTER
BY
ATTORNEY

United States Patent Office 2,987,270
Patented June 6, 1961

2,987,270
VEHICLE FOR TESTING CONTROL SYSTEMS AT SUBSONIC SPEED
Henry H. Porter, Washington, D.C., assignor to the United States of America as represented by the Secretary of the Navy
Filed Mar. 22, 1950, Ser. No. 151,114
5 Claims. (Cl. 244—14)

This invention relates generally to aerial vehicles, and more particularly to a vehicle in which experimental systems of control for jet-propelled aerial projectiles may be mounted and tested while in flight.

Due to the difficult aerodynamic problems encountered at supersonic speeds, development of such control systems, for convenience and economy, has been broken down into two stages. In the first stage, the experimental equipment may be tested in a vehicle capable of subsonic speed only, wherein the aerodynamic conditions are fairly simple and well-known. In the second stage, the equipment which has successfully passed through the first stage is installed in a supersonic vehicle for further tests in which the aerodynamic problems peculiar to supersonic speed will not cause the uncertainty in evaluating the results of tests that would be the case with equipment previously untried even at subsonic velocities. The present invention relates to a subsonic test vehicle. A companion invention of the same inventor, and of even date herewith, relates to a supersonic test vehicle.

An object of the invention, therefore, is to provide convenient relatively simple and inexpensive means for testing equipment that is intended to be incorporated into a vehicle designed to be jet-propelled at a subsonic speed without encountering the difficulty, delay and expense that would be necessary if each such test were actually to be made in an individual jet-propelled vehicle.

Another object of the invention is to provide a test vehicle that is operable by a plurality of rockets, certain of which provide the launching thrust while another or others provide the lessened thrust, of longer duration, necessary to sustain the vehicle in flight after it has been launched.

Other objects and many of the attendant advantages of this invention will be appreciated readily as the same becomes understood by reference to the following detailed description, when considered in connection with the accompanying drawings, wherein:

FIG. 1 is a plan showing a multi-rocket propelled type of subsonic projectile in which the equipment to be tested may be installed;

FIG. 2 is a corresponding front end view; and

FIG. 3 is a corresponding cross-sectional view in the plane 3—3 of FIG. 1.

Referring to the figures of the drawings, the vehicle, which may be of any desired size, but as actually built was conveniently made approximately eight feet long, is provided with a cylindrical shell 10 that terminates at its forward end in a blunt nose portion 11, the interior of which may contain control mechanism, indicators, recorders, telemetric signaling devices, and other equipment necessary for testing purposes.

The shell 10 is provided with two longitudinally spaced sets of stabilizing vanes or airfoils 12, 13 and 14, 15 respectively, each vane having two opposed convex faces. The airfoils in each set are alined with the axis of the shell 10, are spaced symmetrically about the exterior circumference of the shell and radiate at 90-degree angles therefrom, vanes 12 and 14 being shown vertical in the drawing, while 13 and 15 are shown horizontal. These vanes are fitted with full-length movable control surfaces 16 and 17 which are placed under the control of such associated mechanisms as the requirements of the tests may demand.

Within the interior of the shell are grouped several propelling rockets, here shown as a central sustaining rocket 18, indicated in dotted outline in FIG. 1, provided with a venturi port or outlet 19, and surrounded by four additional but smaller launching rockets 20. The rockets are supported by bulkheads 21, 22, 23 and 24, and their thrust is taken by a thrust plate 25 which also forms the forward wall of the rocket chamber.

Inasmuch as it is not within the province of the invention to give a detailed description of the equipment that is to be tested, or of just how said equipment is operatively connected to the control surfaces 16 and 17 it will suffice to state here that each control surface may, for example, have a mechanism 26 attached to its shaft 27 for rotating the control surface 16 or 17, said mechanism 26 having an operating rod or shaft 28 only three of which are shown in FIG. 1, extending into the forward compartment, wherein it is connected to an appropriate actuating element forming part of the equipment 29 undergoing test.

In operation, the launching rockets 20 and the central sustaining rocket 18 are ignited simultaneously; their combined thrust, delivered until the launching rockets are spent, is sufficient to accelerate the vehicle to its subsonic operating speed, after which the thrust of the main or central rocket 18 alone is sufficient to overcome the air drag and maintain the said speed, for the duration of the test.

Obviously many modifications and variations of the present invention are possible in the light of the above teachings. It is therefore to be understood that within the scope of the appended claims, the invention may be practised otherwise than as specifically described.

What is claimed is:

1. A self-propelled aerial vehicle for carrying equipment to be tested for use in guided missiles, comprising, an elongated casing having a closed forward end, said casing being provided with two longitudinally spaced sets of four stabilizing airfoils, said airfoils having two opposed convex faces, one set of stabilizing airfoils being secured to said casing adjacent its mid-length, the other set of stabilizing airfoils being secured to said casing adjacent its rear end, said airfoils in each set being aligned with the longitudinal axis of said casing and spaced symmetrically about the exterior circumference of said casing and radiating at 90-degree angles therefrom, with two airfoils of each set being located in a vertical plane passing through said longitudinal axis of said casing and the other two airfoils of each set being arranged in a horizontal plane passing through said longitudinal axis of said casing, a control surface associated with each of said airfoils and under the control of said equipment being tested, a rocket housed within said casing to propel said aerial vehicle, said casing having longitudinally spaced bulkheads extending transversely within said casing, the bulkhead nearest the forward end of said casing serving as an abutment to receive the rocket thrust, the remaining bulkheads being perforated to receive and position said rocket.

2. A self-propelled aerial vehicle for carrying equipment to be tested for use in guided missiles, comprising, an elongated casing having a closed forward end, said casing being provided with two longitudinally spaced sets of four stabilizing airfoils, said airfoils having two opposed convex faces, one set of stabilizing airfoils being secured to said casing adjacent its mid-length, the other set of stabilizing airfoils being secured to said casing adjacent its rear end, said airfoils in each set being aligned with the longitudinal axis of said casing and spaced symmetrically about the exterior circumference of said casing and radiating at 90-degree angles therefrom, with two airfoils of each set being located in a vertical plane passing through said longitudinal axis of said casing and the other two airfoils of each set being arranged in a horizontal plane passing through said longitudinal axis of said casing, a control surface associated with each of said airfoils and under the control of said equipment being tested, a rocket housed within said casing to propel said aerial vehicle, said casing having a forwardly located bulkhead defining, between itself and the forward end of said casing, an enclosure for the control equipment, said bulkhead serving also as an abutment to receive the rocket thrust.

3. A self-propelled aerial vehicle for carrying equipment to be tested for use in guided missiles, comprising, an elongated casing having a closed forward end, said casing being provided with two longitudinally spaced sets of four stabilizing airfoils, said airfoils having two opposed convex faces, one set of stabilizing airfoils being secured to said casing adjacent its mid-length, the other set of stabilizing airfoils being secured to said casing adjacent its rear end, said airfoils in each set being aligned with the longitudinal axis of said casing and spaced symmetrically about the exterior circumference of said casing and radiating at 90-degree angles therefrom, with two airfoils of each set being located in a vertical plane passing through said longitudinal axis of said casing and the other two airfoils of each set being arranged in a horizontal plane passing through said longitudinal axis of said casing, a control surface associated with each of said airfoils and under the control of said equipment being tested, said casing having therein an axially located sustaining rocket, and several auxiliary launching rockets surrounding said sustaining rocket, and located within the casing.

4. A self-propelled aerial vehicle for carrying equipment to be tested for use in guided missiles, said vehicle comprising a tubular casing having a blunt-nosed closed forward end, a transverse bulkhead in said casing, defining with said closed end a chamber for receiving the equipment being tested, a number of longitudinally spaced transverse bulkheads located rearwardly of said first-named bulkhead, an axially located sustaining rocket abutting at its forward end the first-named bulkhead and passing through the remaining bulkheads, a number of auxiliary launching rockets within the casing and surrounding the sustaining rocket, said launching rockets also passing through certain of said bulkheads, and lying substantially parallel to the sustaining rocket, airfoils secured to said casing, and control surfaces associated with the airfoils and under the control of the equipment being tested.

5. A self-propelled aerial vehicle for carrying equipment to be tested for use in guided missiles, comprising, an elongated casing having a closed forward end, said casing being provided with two longitudinally spaced sets of four stabilizing airfoils, said airfoils having two opposed convex faces, one set of stabilizing airfoils being secured to said casing adjacent its mid-length, the other set of stabilizing airfoils being secured to said casing adjacent its rear end, the airfoils in each set being aligned with the longitudinal axis of said casing and spaced symmetrically about the exterior circumference of said casing and radiating at 90-degree angles therefrom, with two airfoils of each set being located in a vertical plane passing through said longitudinal axis of said casing and the other two airfoils of each set being arranged in a horizontal plane passing through said longitudinal axis of said casing, a control surface associated with each of said airfoils, a control surface rotating mechanism housed in said casing for operating said control surfaces, said equipment under test being housed in said casing and controlling said control surface rotating mechanism, an axially located sustaining rocket housed within said casing for propelling said vehicle, and a plurality of auxiliary rockets surrounding said sustaining rocket and housed within said casing.

References Cited in the file of this patent

UNITED STATES PATENTS

| | | |
|---|---|---|
| 2,419,866 | Wilson | Apr. 29, 1947 |
| 2,424,193 | Rost et al. | July 15, 1947 |
| 2,495,304 | Wyckoff et al. | Jan. 24, 1950 |
| 2,515,048 | Lauritsen | July 11, 1950 |
| 2,644,347 | Katz | July 30, 1953 |

FOREIGN PATENTS

| | | |
|---|---|---|
| 5,099 of 1878 | Great Britain | Dec. 12, 1878 |
| 503,006 | France | June 1, 1920 |
| 191,409 | Great Britain | Feb. 8, 1923 |
| 374,247 | Great Britain | June 9, 1932 |

OTHER REFERENCES

An article entitled Robot Rockets Challenge Sonic Barrier in Popular Mechanics, published December 1947, page 129.